(12) United States Patent
Kong et al.

(10) Patent No.: US 8,949,620 B2
(45) Date of Patent: Feb. 3, 2015

(54) APPARATUS AND METHOD FOR PERFORMING ENCRYPTION AND DECRYPTION OF DATA IN PORTABLE TERMINAL

(75) Inventors: Sun-June Kong, Suwon-si (KR); Sung-Kwan Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 13/466,399

(22) Filed: May 8, 2012

(65) Prior Publication Data

US 2012/0311347 A1 Dec. 6, 2012

(30) Foreign Application Priority Data

May 30, 2011 (KR) ........................ 10-2011-0051506

(51) Int. Cl.
*G06F 11/30* (2006.01)
*G06F 21/60* (2013.01)
*G06F 21/72* (2013.01)
*G06F 21/10* (2013.01)

(52) U.S. Cl.
CPC .............. *G06F 21/602* (2013.01); *G06F 21/72* (2013.01); *G06F 21/10* (2013.01); *G06F 2221/2109* (2013.01); *G06F 2221/2143* (2013.01)
USPC ........................................................ 713/189

(58) Field of Classification Search
CPC ........ G06F 21/72; G06F 21/10; H04L 63/123
USPC ...................... 713/189, 161; 726/2
See application file for complete search history.

(56) References Cited

U.S. PATENT DOCUMENTS

| 2004/0230819 | A1* | 11/2004 | Takahashi | 713/193 |
| 2005/0256910 | A1* | 11/2005 | Kim et al. | 707/200 |
| 2006/0026442 | A1* | 2/2006 | Ittogi | 713/189 |
| 2008/0260159 | A1 | 10/2008 | Osaki | |
| 2009/0172417 | A1 | 7/2009 | Mikami et al. | |
| 2009/0300672 | A1* | 12/2009 | Van Gulik | 725/31 |
| 2010/0332845 | A1* | 12/2010 | Asaka | 713/189 |
| 2012/0271868 | A1* | 10/2012 | Fukatani et al. | 707/822 |

FOREIGN PATENT DOCUMENTS

JP 2009-157584 A 7/2009

OTHER PUBLICATIONS

XP055153238, Jun Auza: "Protect Your Linux Backups with Encryption" Apr. 29, 2011.
XP055153240, Jun Auza: "7 (More) Best Free/Open-source Backup Software for Linux" Apr. 29, 2011.
XP055153242, Anonymous: "Partimage" Apr. 23, 2011.

* cited by examiner

*Primary Examiner* — Anthony Brown
(74) *Attorney, Agent, or Firm* — Jefferson IP Law, LLP

(57) ABSTRACT

An apparatus and a method for performing encryption or decryption of data in a portable terminal, which performs an encryption or decryption operation from a point where the encryption or decryption operation is not generated when power is turned off and then turned on during the encryption or decryption operation, are provided. The apparatus includes a file system analyzer for extracting information of a data block, in which actual user data is stored, through metadata of a file system, and generating a data block list, and a journaling manager for storing a data block corresponding to the data block list among data blocks stored in a memory in a journaling storage unit, and deleting the data block stored in the journaling storage unit when an encryption or decryption operation for the data block stored in the journaling storage unit is completed.

15 Claims, 3 Drawing Sheets

APPARATUS AND METHOD FOR PERFORMING ENCRYPTION AND DECRYPTION OF DATA IN PORTABLE TERMINAL

PRIORITY

This application claims the benefit under 35 U.S.C. §119 (a) of a Korean patent application filed in the Korean Industrial Property Office on May 30, 2011 and assigned Serial No. 10-2011-0051506, the entire disclosure of which is hereby incorporated by reference.

BACKGROUND OF THE INVENTION

1. Field of the Invention

The present invention relates to an apparatus and a method for performing encryption and decryption of data in a portable terminal More particularly, the present invention relates to an apparatus and a method for performing encryption and decryption of data in a portable terminal, which performs an encryption or decryption operation from a point where the encryption or decryption operation is not generated when power is turned off and then turned on during the encryption or decryption operation.

2. Description of the Related Art

In order to encrypt all data stored in advance in a memory of a portable terminal, a data block is encrypted and then stored, or an operation of decrypting the encrypted data block is performed when the data block stored in the memory is input and output. Further, the performance of the encryption or decryption operation may be improved by selectively connecting a hardware accelerator to implement an actual encryption operation or an actual decryption operation through hardware in the encryption or decryption process.

However, while the encryption or decryption process is performed, that is, before the encryption or decryption process is completed, if power of a portable terminal is turned off, it is not possible to restore user data of the data block.

Further, during the encryption or decryption process, the encryption or decryption process is performed for all the data blocks stored in the memory. However, there exists a data block, in which actual data is not stored, among all the data blocks stored in the memory. Therefore, an encryption or decryption process for a data block, in which actual data is not stored, has a problem of increasing the amount of time it takes to perform the encryption or decryption operation.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for performing encryption and decryption of data in a portable terminal, which perform an encryption or decryption operation from a point where the encryption or decryption operation is not generated when power is turned off and then turned on during the encryption or decryption operation.

Another aspect of the present invention is to provide an apparatus and a method for performing encryption and decryption of data in a portable terminal, which perform an encryption or decryption operation only for a data block, in which actual user data is stored, among all the data blocks.

In accordance with an aspect of the present invention, an apparatus for performing encryption or decryption of data in a portable terminal is provided. The apparatus includes a file system analyzer for extracting information of a data block, in which actual user data is stored, through metadata of a file system to create a data block list, and a journaling manager for controlling such that a data block corresponding to the data block list among data blocks stored in a memory is stored in a journaling storage unit, and the data block stored in the journaling storage unit is deleted when an encryption or decryption operation for the data block stored in the journaling storage unit is completed.

In accordance with another aspect of the present invention, a method of performing encryption or decryption of data in a portable terminal is provided. The method includes extracting information of a data block, in which actual user data is stored, through metadata of a file system to generate a data block list, storing a data block corresponding to the data block list among data blocks stored in a memory in a journaling storage unit, and deleting the data block stored in the journaling storage unit when an encryption or decryption operation for the data block stored in the journaling storage unit is completed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
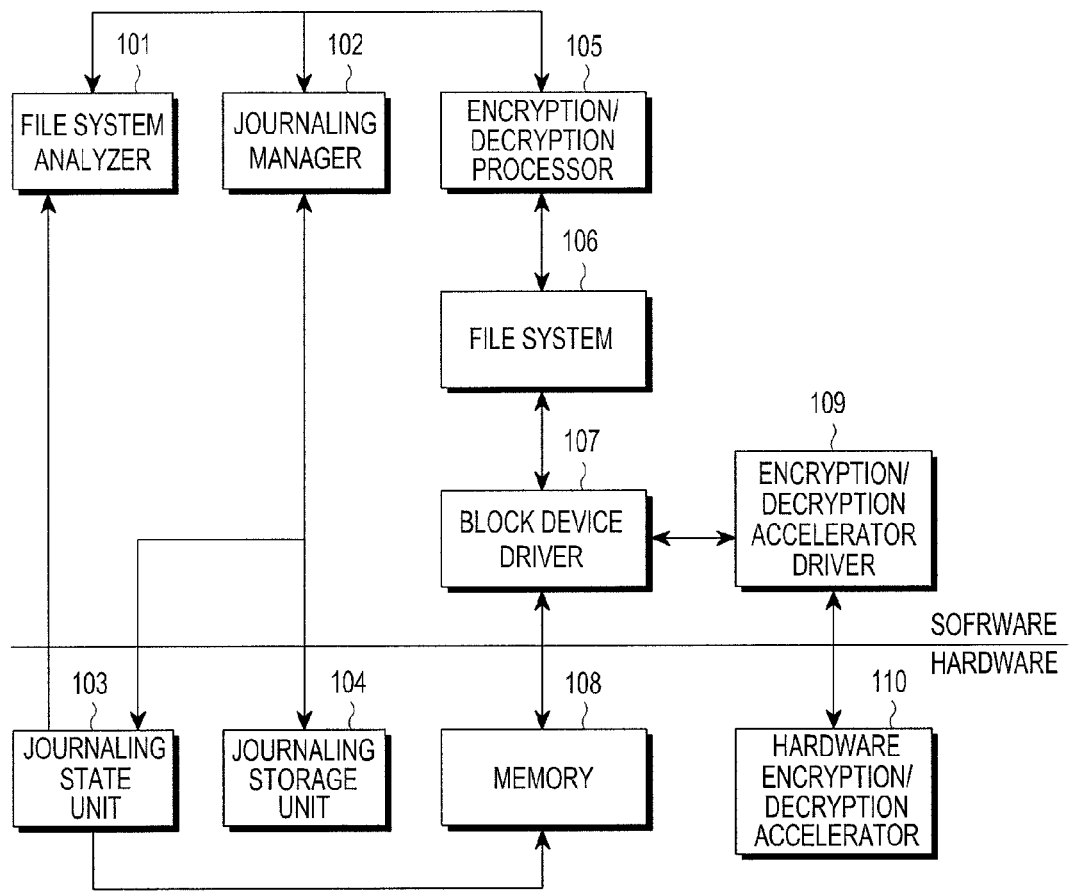
FIG. 1 is a view illustrating a construction of an apparatus for performing encryption or decryption of data in a portable terminal according to an exemplary embodiment of the present invention.

FIG. 1 is a view illustrating a construction of an apparatus for performing encryption or decryption of data in a portable terminal according to an exemplary embodiment of the present invention.

Referring to FIG. 1, the apparatus for performing encryption or decryption of data in the portable terminal includes a file system analyzer 101, a journaling manager 102, a journaling state unit 103, a journaling storage unit 104, an encryption/decryption processor 105, a file system 106, a block device driver 107, a memory 108, an encryption/decryption accelerator driver 109, and a hardware encryption/decryption accelerator 110.

The file system analyzer 101 analyzes the file system 106, extracts information of a data block in which actual data is stored through metadata stored in a metadata block included in the file system 106, and generates a data block list.

The journaling manager 102 stores a data block corresponding to the data block list among data blocks stored in the memory 108, in the journaling storage unit 104, and controls such that a state value indicating a storage state of the journaling storage unit 104 is stored in the journaling state unit 103.

The state value stored in the journaling state unit 103 is information on a data block stored in the journaling storage unit 104, and reports an order of data blocks, for which encryption or decryption is being performed, and whether encryption or decryption has been completed.

The journaling manager 102 stores a data block corresponding to the data block in the journaling storage unit 104 in the unit of a journaling size, and the unit of the journaling size corresponds to a size of the journaling storage unit 104.

Further, the journaling manager 102 controls such that only a data block corresponding to the data block list among the data blocks stored in the memory 108 is sequentially stored in the journaling storage unit 104.

When an encryption or decryption operation for the data block stored in the journaling storage unit 104 is completed, the journaling manager 102 controls such that the data block stored in the journaling storage unit 104 is deleted and a state value stored in the journaling state unit 103 is deleted at the same time.

Before the encryption or decryption operation for the data block stored in the journaling storage unit 104 is completed, if power of the portable terminal is turned off and then turned on, the journaling manager 102 detects that the encryption or decryption operation has not been completed in the journaling storage unit 104 through a state value existing in the journaling state unit 103. Further, the journaling manager 102 controls such that the data block stored in the journaling storage unit 104 is transmitted to the encryption/decryption processor 105 in order to perform encryption or decryption from the data block stored in the journaling storage unit 104. At this time, since the journaling manager 102 knows an order of data blocks stored in the journaling storage unit 104 through the state value stored in the journaling state unit 103, the journaling manager 102 stores a next data block according to the order of the memory 108 in the data block list in the journaling storage unit 104, and controls such that the encryption or decryption operation is completed while changing the state value of the journaling state unit 103.

The journaling state unit 103 stores a state value indicating a storage state of the journaling storage unit 104. The state value is information on a data block stored in the journaling storage unit 104, and indicates an order of data blocks, for which encryption or decryption is being performed, and whether encryption or decryption has been completed.

The journaling storage unit 104 stores a data block for which encryption or decryption is performed, and the data block is deleted when an encryption or decryption operation for the data block is completed.

The encryption/decryption processor 105 performs encryption or decryption for a data block stored in the journaling storage unit 104.

Further, when an encryption or decryption operation for a data block corresponding to the data block list is fully completed, the encryption/decryption processor 105 performs an encryption or decryption operation for metadata. At this time, the encryption/decryption processor 105 performs an encryption or decryption operation for the metadata stored in the journaling storage unit 104, and the encrypted or decrypted metadata refers to metadata corresponding to a data block of the data block list.

The file system 106 logically manages a physical data block stored in the memory 108, and is divided into a metadata block storing metadata and a metadata block storing user data. Actual user data may be allocated to the data block to be stored, or may not be allocated to the data block so that a certain value, instead of the actual user data, may be stored in the data block.

The metadata contains managing information indicating general information of the file system together with an indication of whether actual user data is stored in a corresponding data block. Accordingly, through an analysis of the metadata, it may be determined whether the actual user data is stored in the corresponding data block.

The block device driver 107 performs an operation of inputting and outputting a data block and a metadata block stored in the memory 108 under a control of the file system 106.

The memory 108 stores a physical data block and a metadata block corresponding to the data block. The memory 108 may be a non-volatile memory such as a flash memory.

The encryption/decryption accelerator driver 109 operates the selectively connected hardware encryption/decryption accelerator 110, and allows the hardware encryption/decryption accelerator 110 to perform an encryption or decryption operation.

The hardware encryption/decryption accelerator 110 is selectively connected to perform encryption or decryption for a data block or a metadata block stored in the memory 104, with the encryption/decryption processor 105.

An operation of encrypting or decrypting data in the apparatus for performing encryption or decryption of data in the portable terminal will be described in detail with reference to FIGS. 2A and 2B.

Figure 2A:
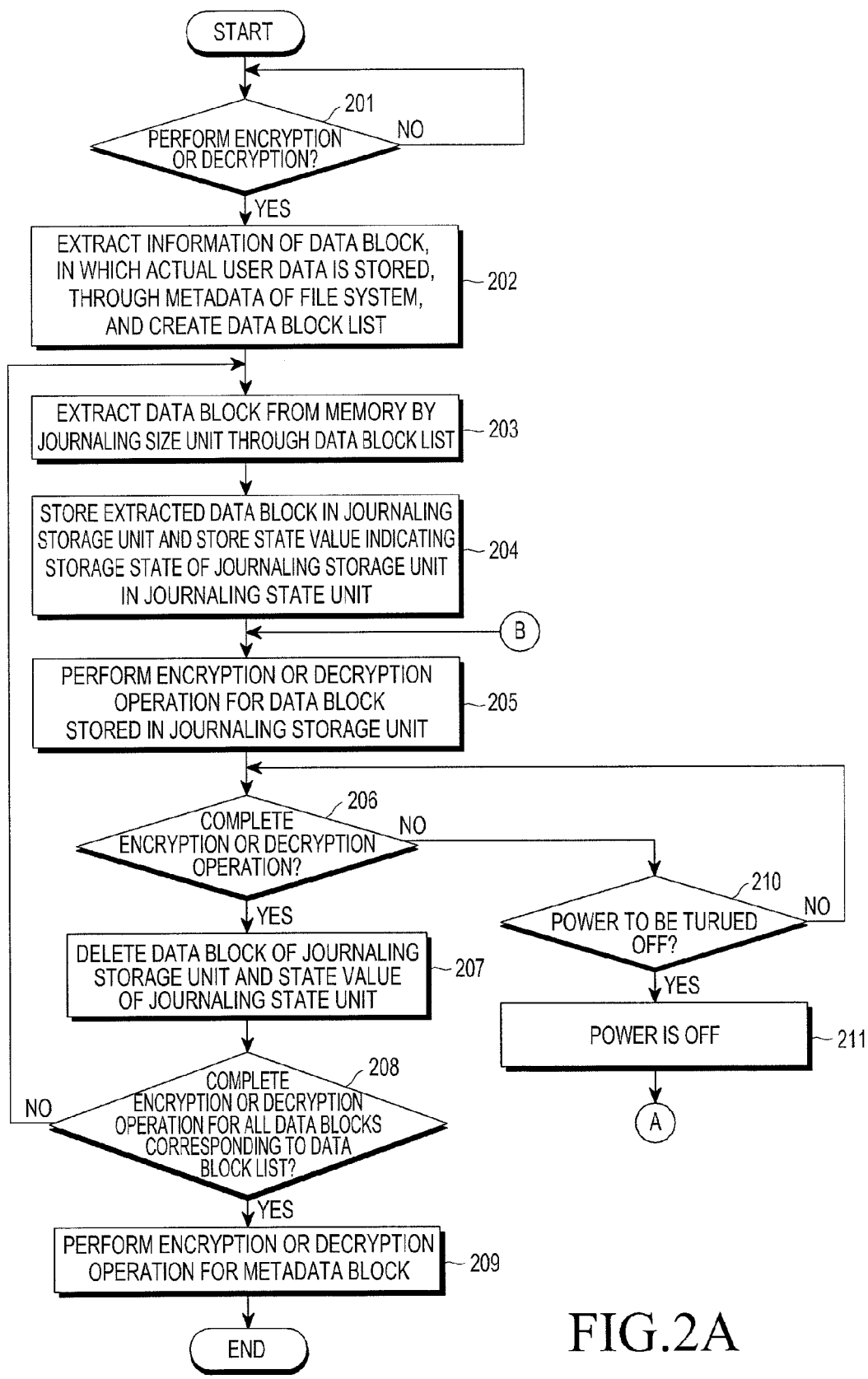
FIGS. 2A to 2B are flowcharts illustrating an encryption or decryption process of data in a portable terminal according to an exemplary embodiment of the present invention.
Figure 2B:
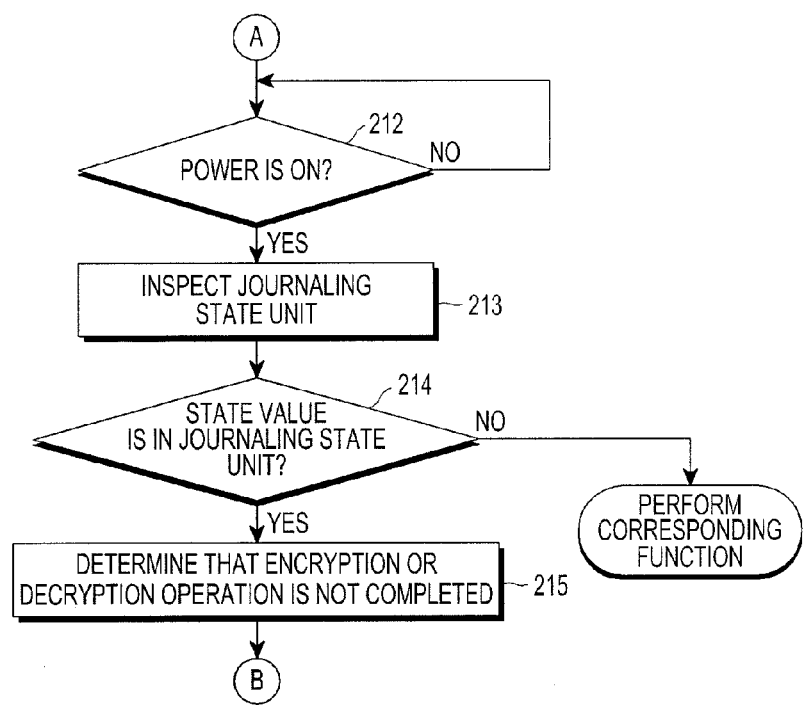

FIGS. 2A to 2B are flowcharts illustrating an encryption or decryption process of data in a portable terminal according to an exemplary embodiment of the present invention.

Hereinafter, exemplary embodiments of the present invention will be described in detail with reference to FIGS. 2A to 2B together with FIG. 1.

Referring to FIG. 2A, when encryption or decryption for a specific file stored in the memory 108 is selected in the portable terminal, a controller (not shown) detects the encryption or decryption in step 201, and switches a mode to an encryption or decryption performing mode.

In the encryption or decryption performing mode, the file system analyzer 101 analyzes metadata stored in metadata blocks of the file system, extracts information of a data block in which actual user data is stored, and generates a data block list in step 202. The generated data block list is stored in the memory 108.

When the data block list is generated, the file system 107 controls such that a data block corresponding to the data block list is physically extracted from the memory 108 through the block device driver 107 in step 203. At this time, the extracted data block is extracted in the unit of a journaling size, and the unit of a journaling size corresponds to a size of the journaling storage unit 104.

When the data block is extracted in the unit of a journaling size, the journaling manger 102 stores the data block of the journaling size unit in the journaling storage unit 104, and stores a state value indicating a storage state of the journaling storage unit 104 in the journaling state unit 103 in step 204. At this time, the state value may be information on a data block stored in the journaling storage unit 104, that is, an order of the data block.

When the data block is stored in the journaling storage unit 108, the encryption/decryption processor 105 performs encryption or decryption for the data block stored in the journaling storage unit 108 in step 205.

When an encryption or decryption operation for the data block stored in the journaling storage unit 108 is completed, the encryption/decryption processor 105 detects the completion of the encryption or decryption operation in step 206, and informs the journaling manager 102 of the completion of the encryption or decryption operation.

Then, the journaling manager 102 deletes the data block stored in the journaling storage unit 104 and the state value stored in the journaling state unit 103 in step 207.

When an encryption or decryption operation of all data blocks corresponding to the data block list is not complete, the controller detects the noncompletion in step 208, and performs an encryption or decryption operation for all data blocks corresponding to the data block list while repeating steps 203 to 208.

When the encryption or decryption operation of all data blocks corresponding to the data block list is completed, the controller detects the completion in step 208, and the encryption/decryption processor 105 extracts the metadata block corresponding to the data block, for which encryption or decryption has been completed, from the memory 108 to perform an encryption or decryption operation in step 209.

In step 209, the encryption/decryption processor 105 can perform encryption or decryption for the metadata block stored in the journaling storage unit 104.

Further, if power of the portable terminal is turned off while the encryption/decryption processor 105 performs the encryption or decryption operation for the data block stored in the journaling storage unit 104 in step 205, the controller detects that power of the portable terminal is to be turned off in steps 206 and 210, and turns off the power of the portable terminal in step 211.

Referring to FIG. 2B, subsequently, when power of the portable terminal is turned on, the controller detects that the power of the portable terminal is turned on in step 212, and the journaling manager 102 examines the journaling state unit 103 in step 213.

When a state value indicating a storage state of the journaling storage unit 104 exists in the journaling state unit 103, the journaling manager 102 detects the existence of the state value in step 214, and determines that the previous encryption or decryption operation has not been completed in step 215. When a state value indicating a storage state of the journaling storage unit 104 does not exist in the journaling state unit 103, a corresponding function is performed.

Through steps 205 to 209, the journaling manager 102 requests the encryption or decryption operation for the data block stored in the journaling storage unit 104 from the encryption/decryption processor 105.

Further, the journaling manager 102 knows a next data block through a state value stored in the journaling state unit 103, that is, an order of a data block stored in the journaling storage unit 104.

Accordingly, when an encryption or decryption operation for the data block stored in the journaling storage unit 104 is completed, the journaling manager 102 stores a data block corresponding to information of a next block in the data block list, in the journaling storage unit 104, so that the encryption or decryption operation may be performed beginning with a data block for which encryption or decryption is not performed.

The apparatus and the method for performing encryption and decryption of data in the portable terminal according to exemplary embodiments of the present invention perform the encryption or decryption operation from a point where a problem is generated when power is turned off and then turned on before the encryption or decryption operation is completed, so that it is possible to safely manage user data.

Also, the encryption or decryption operation is performed only for actual user data, so that it is possible to minimize the encryption or decryption processing time.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for performing encryption or decryption of data in a portable terminal, the apparatus comprising:
    a file system analyzer configured to extract information of a data block, in which actual user data is stored, through metadata of a file system, and to generate a data block list including the information of the data block extracted; and
    a journaling manager configured to extract a data block corresponding to the data block list from a memory, to store the data block extracted from the memory in a journaling storage unit in the unit of a journaling size, the unit of the journaling size corresponding to a size of the journaling storage unit, and to delete the data block stored in the journaling storage unit when an encryption or decryption operation for the data block stored in the journaling storage unit is completed.

2. The apparatus as claimed in claim 1, wherein, when the encryption or decryption operation for the data block stored in the journaling storage unit is completed, the journaling manager is further configured to delete a state value stored in a journaling state unit.

3. The apparatus as claimed in claim 2, wherein, when the data block is stored in the journaling storage unit, the journaling manager is further configure to store a state value indicating a storage state of the journaling storage unit in a journaling state unit.

4. The apparatus as claimed in claim 3, wherein the state value stored in the journaling state unit is information on the data block stored in the journaling storage unit, indicates an order of data blocks, for which encryption or decryption is being performed, and indicates whether encryption or decryption has been completed.

5. The apparatus as claimed in claim 1, wherein, when power of the portable terminal is turned off and then turned on before the encryption or decryption operation for the data block is completed, the journaling manager is further configured to detect that the encryption or decryption operation has not been completed through a state value stored in a journaling state unit, and request an encryption/decryption processor to perform encryption or decryption for the data block stored in the journaling storage unit.

6. The apparatus as claimed in claim 1, wherein the journaling manager is further configured to sequentially store the data blocks extracted from memory in the journaling storage unit.

7. The apparatus as claimed in claim 1, further comprising:
the journaling storage unit further configured to store a data block for which encryption or decryption is performed;
a journaling state unit configured to store a state value indicating a storage state of the journaling storage unit; and
an encryption/decryption processor configured to perform encryption or decryption for the data block stored in the journaling storage unit.

8. The apparatus as claimed in claim 7, wherein, when the encryption or decryption operation for the data block corresponding to the data block list has been completed, the encryption/decryption processor is further configured to perform an encryption or decryption operation for metadata.

9. A method of performing encryption or decryption of data in a portable terminal, the method comprising:
extracting information of a data block, in which actual user data is stored, through metadata of a file system and generating a data block list including the information of the data block extracted;
extracting a data block corresponding to the data block list from a memory;
storing the data block extracted from the memory in a journaling storage unit in the unit of a journaling size, the unit of the journaling size corresponding to a size of the journaling storage unit; and
deleting the data block stored in the journaling storage unit when an encryption or decryption operation for the data block stored in the journaling storage unit is completed.

10. The method as claimed in claim 9, wherein, when the encryption or decryption operation for the data block stored in the journaling storage unit is completed, deleting a state value stored in a journaling state unit.

11. The method as claimed in claim 9, wherein the storing of the data block comprises storing a state value indicating a storage state of the journaling storage unit in a journaling state unit when the data block is stored in the journaling storage unit.

12. The method as claimed in claim 11, wherein the state value stored in the journaling state unit is information on the data block stored in the journaling storage unit, indicates an order of data blocks, for which encryption or decryption is being performed, and indicates whether encryption or decryption has been completed.

13. The method as claimed in claim 9, further comprising:
inspecting the journaling state unit when power of the portable terminal is turned off and then turned on before the encryption or decryption operation for the data block is completed; and
detecting, when there exists a state value in the journaling state unit, that the encryption or decryption operation has not been completed through the state value, and performing encryption or decryption of data from the data block stored in the journaling storage unit.

14. The method as claimed in claim 9, wherein the data blocks extracted from the memory are sequentially stored in the journaling storage unit.

15. The method as claimed in claim 9, further comprising performing an encryption or decryption operation for metadata when the encryption or decryption operation for the data block corresponding to the data block list is completed.

* * * * *